March 18, 1969  J. M. BRASSEUR  3,433,519
AUTOMOBILE DOOR INTERNAL HANDLE ASSEMBLY
Filed Feb. 28, 1967  Sheet 1 of 2

United States Patent Office 3,433,519
Patented Mar. 18, 1969

3,433,519
AUTOMOBILE DOOR INTERNAL
HANDLE ASSEMBLY
Jacques Marc Brasseur, St. Germain en Laye, France, assignor to Societe Anonyem des Automobiles Simca, a French society
Filed Feb. 28, 1967, Ser. No. 619,281
Claims priority, application France, Mar. 8, 1966, 52,436/66
U.S. Cl. 292—336.3                    6 Claims
Int. Cl. E05b 3/04

ABSTRACT OF THE DISCLOSURE

An automobile door internal handle assembly in which the operating member lies wholly below the trim panel of the door. The operating member is accommodated in a recess stamped in the internal skin of the door, this recess including a housing for a boss of the operating member about which the latter pivots. The boss is located in the housing by for example a resilient fastener.

This invention relates to a door handle assembly, particularly for automobile vehicles.

In automobile vehicles, it is known to use for safety reasons, internal door handles which are recessed in the internal face of the door, in such a manner as not to present any projecting part capable of injuring a passenger in the case of an accident.

Such door handles have already been proposed, but up to the present time they have had the disadvantage of being mounted in a special box, which is a relatively expensive and complicated solution to the problem.

In accordance with the present invention there is provided in a door handle assembly comprising a handle which can be engaged by an operator to open the door, said handle lying wholly below the surface of the door to which the handle is fitted, the improvement comprising, an operating member, pivot means, a mechanism-actuating member rigid with the operating member and the pivot means and together comprising said handle, a door panel formed with a stamped out recess including a first housing space accommodating the operating member, a second housing space accommodating the mechanism-actuating member and a locating housing accommodating the pivot means, and means locating the pivot means in the locating housing.

An embodiment of a handle assembly in accordance with the invention will now be described, by way of example, with reference to the accompanying diagrammatic drawings, in which.

Figure 1:
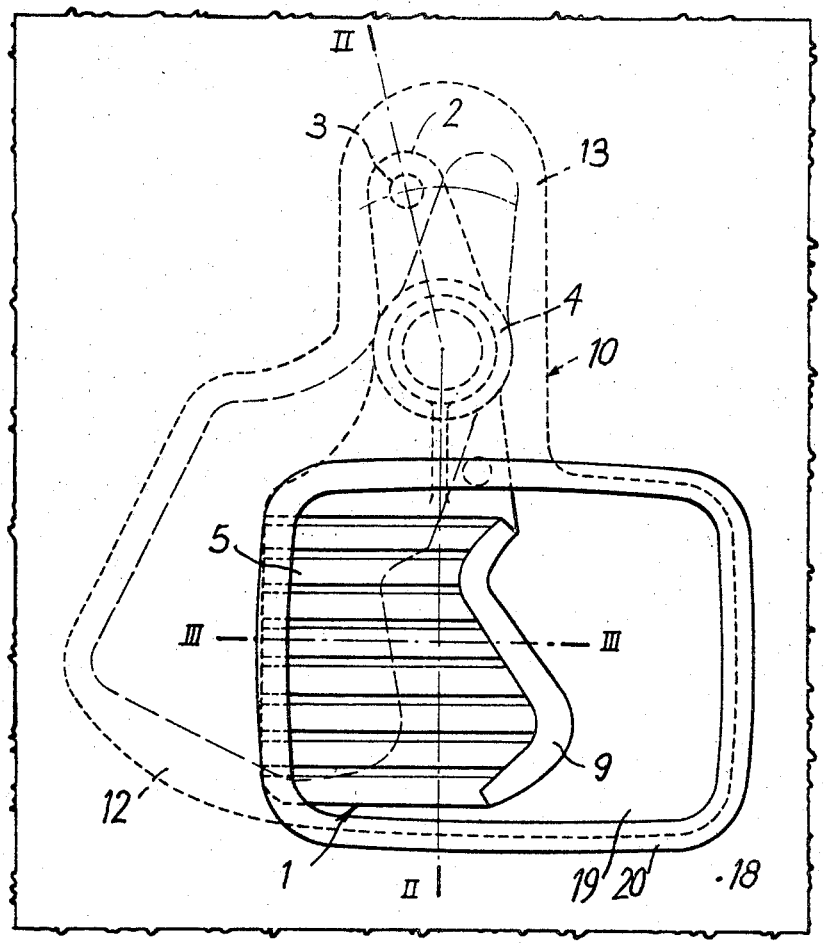
FIG. 1 is a fragmentary view of one face of the assembly in elevation.
Figure 3:
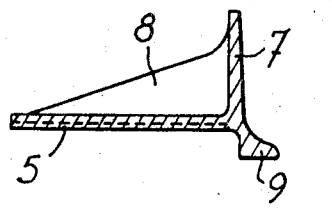
FIG. 3 is a view in section of the handle on the line III—III of FIG. 1.
Figure 2:
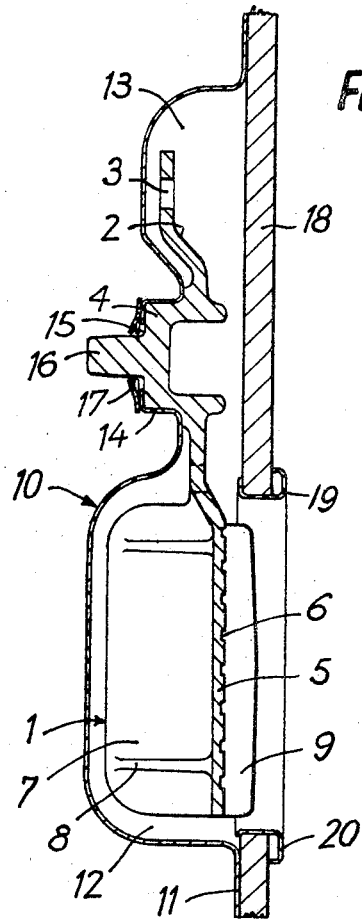
FIG. 2 is a view in section of the handle assembly on the line II—II of FIG. 1.

The recessed door handle in accordance with the invention as shown in FIGS. 1, 2, 3 comprises an operating member 1, a mechanism-actuating member in the form of a lever 2 having an aperture 3 in which there can be engaged a pivot of a control rod of the lock or other mechanism, not shown in the drawing, and pivot means in the form of a cylindrical boss 4 acting as the pivot of the handle. The operating member 1 is constituted by a plate 5 disposed in a plane normal to the axis of the boss 4, the plate being longitudinally grooved as at 6 in order to improve its appearance. A flange 7 of the member 1 is normal to the plate 5 and the fingers of the user can be applied against this flange for effecting opening of the door. Reinforcements 8 are disposed between the plate 5 and the flange 7, and a rim 9 of the plate which when viewed sideways has the form of an S, is provided in order to facilitate engaging the handle.

The whole door handle may advantageously comprise a single metallic part particularly a casting, or may comprise any other material and particularly a synthetic-resin. The handle is arranged in accordance with the invention, in a recess 10, formed by stamping the internal wall 11 of the door (FIGS. 1 and 2) and which comprises housings 12 and 13 accommodating and allowing for the operation of the operating member 1 and of the lever 2 and a cylindrical locating housing 14 in which there is pivotally mounted the cylindrical boss 4. This housing 14 has an aperture 15 formed in the base thereof in which there is engaged a centering spigot 16 extending from the boss 4.

A fastener constituted by a resilient washer 17 engages the spigot 16 and lies in contact with the base of the housing 14, the said washer ensuring the retention of the handle in the recess 10 whilst nevertheless allowing it to rotate.

The dimensions of the handle 1, 2 and of the recess are such that when the handle is in place none of its parts extend, into the interior of the vehicle, beyond the surface of an internal trim panel 18 of the door of the vehicle which is disposed against the internal wall 11 of the door.

An opening or cut-out 19 by which it is possible to gain access to the operating member 1 of the handle, is provided in the trim panel 18, the said opening being surrounded by a trim strip 20 shaped to ensure a pleasing appearance of the assembly.

Figure 4:
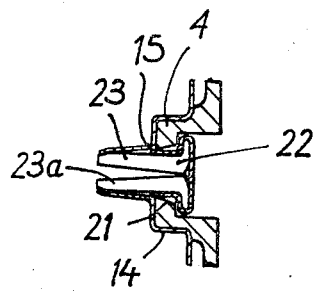
FIG. 4 is a fragmentary view in section on the pivotal axis of the handle of an alternative method for retaining and centering the pivot axis of the assembly.

In order to secure the handle by its cylindrical boss 4, there is employed in the construction of FIG. 2 a spigot 16 provided with a washer 17, but it is possible to use any other securing means and in particular that shown in FIGURE 4, in which the cylindrical boss 4 has an opening 21 in which there is engaged a resilient stud or other fastener 22, of which the two limbs 23, 23a of the shank thereof pass through the aperture 15 at the base of the housing 14 and ensure the locating and engagement thereof. Each limb of the split shank has a step which engages the material surrounding the aperture 15.

Figure 6:
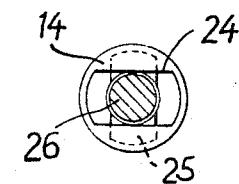
FIG. 6 is a view in section on the line VI—VI of FIG. 5.
Figure 5:
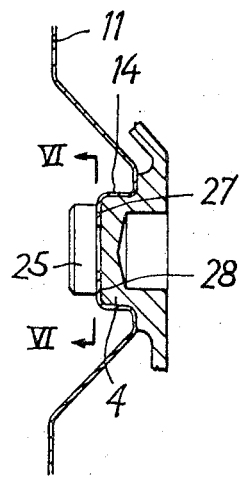
FIG. 5 is a sectional view of a further embodiment of retaining members and for centering the pivot axis.

In another fixing method for the handle as shown in FIGS. 5 and 6, the base of the locating housing 14 has and elongate opening 24 of oblong shape which can be engaged by a complementary oblong head 25 which is provided on the boss 4 and which is connected to the latter by a cylindrical part 26 defining between the head 25 and the boss 4, slots 27, 28 which are of a size at least equal to the thickness of the wall 11 of the door.

The securing of the handle is effected in this modification, in the following manner:

The boss 4 of the handle is offered up to the housing 14 in such a manner that the largest dimension of the head 25 comes into engagement with the oblong opening 24. The head 25 which is of a shape complementary to the opening 24 engages in the latter and the boss 4 being in place in its housing 14 it is sufficient to cause the handle to pivot through 90° to its normal operating position.

In this position, the handle is fixed transversely by the presence of the sheet metal 11 in the slots 27, 28 and centering is provided by the boss 4 in its housing 14.

However, in use of this mounting, it is necessary to increase the dimensions of the housings, 12, 13 of the recess provided in the internal wall of the door in order to allow this 90° rotation, the dimensions shown in FIG. 1 allowing only the clearance necessary for operation of the handle and are only calculated for the fixing methods of FIGS. 2 and 4.

It should be understood, that the invention is not to be considered to be limited to the embodiments disclosed and described in detail, because various modifications can be used without departing from its scope.

What is claimed is:

1. A door handle assembly comprising a pivoting handle which can be engaged by an operator to open a door, said handle lying wholly below the surface of the door in which the handle is pivotally mounted; the improvement comprising:
    an operating member,
    a pivot element,
    a mechanism-actuating member formed integrally with the operating member and the pivot element,
    said actuating member, operating member and pivot element together comprising said handle,
    a door panel formed with a stamped out recess including a first separate housing space accommodating the operating member,
    a second separate housing space accommodating the mechanism-actuating member, and
    a separate locating housing holding the pivot element, and
    means holding the pivot element in the locating housing, whereby said handle may only pivot within said housings.

2. A handle assembly according to claim 1,
    a trim panel partly covering said recess and having an opening therein opposite the operating member to enable access by a operator to said operating member.

3. An assembly according to claim 1, wherein said holding means comprises:
    a spigot rigid with said pivot element, and
    a resilient fastener,
    said pivot element locating housing having an aperture through which the spigot passes, and the spigot being retained and located in said aperture by the said resilient fastener which lies against the locating housing.

4. An assembly according to claim 1, wherein the pivot element locating housing has an aperture centered on the pivot axis of the pivot element and wherein said holding means comprises
    a resilient fastener having
        a head and
        a longitudinally split, stepped shank,
    the head of the fastener engaging one surface of the locating housing and the steps of the fastener engaging another surface of the locating housing.

5. An assembly according to claim 1, wherein said pivot element comprises
    a boss,
    a head of elongate form transversely to the pivot axis, and
    a cylindrical shank connected to the boss and the head, thereby defining slots,
    and wherein the pivot element locating housing has has an aperture complementary to the elongate form of the head, said pivot element being located in said housing by insertion of the head through the complementary aperture and subsequently turning the head through a right angle thereby to engage material bounding the slot in said slots.

6. An assembly according to claim 1, wherein said operating member comprises
    an operating plate disposed in a plane normal to the pivot axis of the handle, and
    a flange extending normally from the plate into the recess.

References Cited

UNITED STATES PATENTS

| | | | |
|---|---|---|---|
| 1,684,499 | 9/1928 | Mayer | 292—347 |
| 2,136,854 | 11/1938 | Knott | 292—169 |
| 2,793,388 | 5/1957 | Bartholomew | 16—171 |

MARVIN A. CHAMPION, *Primary Examiner.*

EDWARD J. McCARTHY, *Assistant Examiner.*